(12) United States Patent
Naiknaware (10) Patent No.: US 9,660,451 B1
(45) Date of Patent: May 23, 2017

(54) ISLANDED OPERATION OF DISTRIBUTED POWER SOURCES

(75) Inventor: Ravindranath Naiknaware, Portland, OR (US)

(73) Assignee: SunPower Corporation, San Jose, CA (US)

( * ) Notice: Subject to any disclaimer, the term of this patent is extended or adjusted under 35 U.S.C. 154(b) by 515 days.

(21) Appl. No.: 13/251,890

(22) Filed: Oct. 3, 2011

Related U.S. Application Data (60) Provisional application No. 61/417,875, filed on Nov. 29, 2010.

(51) Int. Cl.
*H02J 3/38* (2006.01)

(52) U.S. Cl.
CPC .......... *H02J 3/38* (2013.01); *H02J 2003/388* (2013.01); *Y04S 10/20* (2013.01); *Y04S 10/525* (2013.01); *Y04S 10/54* (2013.01); *Y04S 10/58* (2013.01); *Y04S 20/14* (2013.01)

(58) Field of Classification Search
CPC ....................................................... G06F 1/00
USPC ....................................................... 700/295
See application file for complete search history.

(56) References Cited

U.S. PATENT DOCUMENTS

| | | | | |
|---|---|---|---|---|
| 5,638,295 | A * | 6/1997 | Lagree .................. | H02J 3/14 187/248 |
| 6,882,904 | B1 * | 4/2005 | Petrie et al. ................. | 700/295 |
| 7,457,688 | B2 * | 11/2008 | Szepek et al. ................ | 700/287 |
| 2003/0080741 | A1 * | 5/2003 | LeRow et al. ................ | 324/320 |
| 2005/0057950 | A1 * | 3/2005 | Colby et al. .................. | 363/74 |
| 2007/0010916 | A1 * | 1/2007 | Rodgers .................... | H02J 3/14 700/295 |
| 2008/0071427 | A1 * | 3/2008 | Szepek et al. ................ | 700/287 |
| 2008/0094860 | A1 * | 4/2008 | Falk ..................... | H02M 3/3372 363/17 |
| 2008/0157538 | A1 * | 7/2008 | Lewis ................... | F03D 7/0284 290/4 R |
| 2008/0231114 | A1 * | 9/2008 | Tolnar et al. .................. | 307/38 |
| 2009/0000654 | A1 * | 1/2009 | Rotzoll et al. ................ | 136/244 |

(Continued)

OTHER PUBLICATIONS

Mynam, V. et al. "Islanding Detection and Adaptive Load Shedding," Schweitzer Engineering Laboratories, Inc. Application Note, AN2009-59, 2009, 2 pages.

(Continued)

*Primary Examiner* — Sean Shechtman
(74) *Attorney, Agent, or Firm* — Barnes & Thornburg LLP (57) ABSTRACT

A method for synchronizing distributed generation power sources during an islanding event may include synchronizing a first one of the islanded local power sources to a master local reference, and synchronizing a second one of the islanded local power sources to the master local reference. In-rush current may be controlled by energizing the local load sequentially in stages when a utility grid is connected to the point of common connection. The local loads may also be selectively energized in response to the amount of available local power generating capacity in an islanding situation. A method for controlling a system having local loads and local power sources may include evaluating the power available from local power sources, adaptively controlling the local loads in response to the power available from the local power sources, and operating the local loads and local power sources as an independent system during an islanding event.

12 Claims, 5 Drawing Sheets

(56) References Cited

U.S. PATENT DOCUMENTS

| | | | |
|---|---|---|---|
| 2010/0073175 A1* | 3/2010 | Lontka | 340/635 |
| 2010/0106641 A1* | 4/2010 | Chassin et al. | 705/40 |
| 2010/0259955 A1* | 10/2010 | Shimada | 363/49 |
| 2010/0309692 A1* | 12/2010 | Chisenga et al. | 363/37 |
| 2010/0315850 A1* | 12/2010 | J'Neva Devi et al. | 363/95 |
| 2011/0043160 A1* | 2/2011 | Serban | 320/101 |
| 2011/0071697 A1* | 3/2011 | Torre et al. | 700/295 |
| 2011/0187200 A1* | 8/2011 | Yin et al. | 307/86 |
| 2011/0298305 A1* | 12/2011 | Chisenga et al. | 307/151 |
| 2012/0080942 A1* | 4/2012 | Carralero | H02J 3/383 307/24 |
| 2014/0324235 A1* | 10/2014 | Miller | H02J 4/00 700/286 |

OTHER PUBLICATIONS

Mulhausen, J. et al., "Anti-Islanding Today, Successful Islanding in the Future," IEEE, Mar. 29, 2010, 8 pages.

Hirodontis, S. et al., "Dynamic Study for Islanded Distribution Network," The International Conference on Electrical Engineering, Oct. 31, 2009, 6 pages.

Tantimaporn, T. et al., "Islanding Operation of Mini-Hydro Generation in Real Distribution Network," Energy and Sustainable Development: Issues and Strategies, Abstract, Jun. 2, 2010, 1 page.

Li, X. et al., "On-line Islanding Operation Based on CSP," Power and Energy Engineering Conference, Asia-Pacific, Mar. 28, 2010, Abstract, 1 page.

Issicaba, D. et al., "Islanding Operation of Active Distribution Grids Using an Agent-based Architecture," Innovative Smart Grid Technologies Conference Europe, Oct. 11, 2010, Abstract, 1 page.

Zhang, S. et al., "Impact Study on International Islanding Strategies of Distribution Networks Based on Distributed Generation," International Conference on Computer Design and Applications, Jun. 25, 2010, Abstract, 1 page.

Koch, S. et al., "Mitigation of Cascading Failures by Real-Time Controlled Islanding and Graceful Load Shedding," Symposium on Bulk Power System Dynamics and Control, Aug. 1, 2010, Abstract, 1 page.

Ng, E. J. et al., "Multi-Microgrid Control System," Power and Energy Society General Meeting, Jul. 25, 2010, Abstract, 1 page.

Mahat, P. et al., "Control Strategies for Gas Turbine Generators for Grid Connected and Islanding Operations," Transmission and Distribution Conference and Exposition, Apr. 19, 2010, Abstract, 1 page.

Lei, Q. et al., "Islanding Control of DG in Microgrids," Power Electronics and Motion Control Conference, May 17, 2009, Abstract, 1 page.

Hirodontis, S. et al., "An Adaptive Load Shedding Method for Intentional Islanding," Conference on Clean Electrical Power, Abstract, Jun. 9, 2009, 1 page.

Dola, H. M. et al., "Intentional Islanding and Adaptive Load Shedding to Avoid Cascading Outages," IEEE, 2006, 8 pages.

Wikipedia, "Definition of Islanding," downloading from Internet Oct. 1, 2011, 8 pages.

Walker, G.R. et al., "PV String Per-Module Maximum Power Point Enabling Converters," School of Information Technology and Electrical Engineering, The University of Queensland, 2003, 6 pages.

* cited by examiner

ISLANDED OPERATION OF DISTRIBUTED POWER SOURCES

CROSS-REFERENCE TO RELATED APPLICATIONS

This application claims priority from U.S. Provisional Patent Application Ser. No. 61/417,875 titled Islanded Operation of Grid-Tied Power Sources filed Nov. 29, 2010.

BACKGROUND

Electric utility grids have traditionally been supplied by large centralized power plants. These large power plants are interconnected by high capacity transmission lines that provide improved grid stability, increased fault tolerance, and increased flexibility in load profile management. In these traditional systems, power is distributed outward from the centralized power plants through a hierarchy of power line networks to multiple points of usage.

The increasing use of renewable power sources, however, has introduced distributed generation (DG) capacity to power grids. DG power sources may be located anywhere on the grid, typically close to a local power load. Examples of DG power sources include photovoltaic (PV) panels and wind turbines which are scattered at customer locations throughout the grid. DG sources can vary in size from a few watts to several mega-watts. The amount of power available from these sources can vary based on various factors such as available solar irradiation and wind speeds. At certain times, all of the power from these sources may be consumed by local building loads, while at other times, excess power is fed back into the grid. Thus, utility grids have become complex, interconnected structures with power flowing in multiple directions depending on the availability of power from multiple sources and demand from multiple loads at any specific time.

"Islanding" is a condition in which a portion of a grid containing some power generation capacity and some amount of load becomes isolated from the remainder of the grid, but continues to operate independently because the phase-locked loop (PLL) or other synchronization functionality continues to provide a reference for the power flowing in the isolated portion of the grid. Depending on the specific conditions, islanding may be problematic because the local power generation capacity loses synchronization with the grid. Moreover, when an islanding condition is detected, an assumption is typically made that there is no point in harvesting power from the local power generation capacity because the power cannot be fed back into the grid. Thus, if an islanding condition is detected, the local power generation capacity is disabled and disconnected from the grid. This is referred to as anti-islanding (AI) protection, and the detection of islanding conditions is an ongoing challenge.

DETAILED DESCRIPTION

Although islanding is typically considered a condition to be avoided, in some situations, it may actually be an acceptable or even desirable condition. For example, if a local electrical load is present and capable of consuming power, it may be wasteful to disable the local power generation capacity and let otherwise useful and available energy go unharvested. Moreover, in locations such as developing nations where power grids may be unreliable, harvested energy from solar, wind, and other sources may continue to be used locally when the utility grid is down.

Therefore, according to some inventive principles of this patent disclosure, a local grid-tied power source may continue to operate even when an islanding condition is detected. This continued operation may be used, for example, to provide power to a local load, a local energy storage device, etc. The continued operation may be facilitated with a local electronic reference to provide a frequency and/or phase reference for the local power source or sources. Smart communications may also be used on the installed system to coordinate the operation of the components.

In situations where multiple local power sources may be islanded together in a common isolated area, one local reference may serve as a master reference while the references for the other local power sources may synchronize to the master reference. Thus, multiple distributed generators may be able to form a self-sustaining island without relying on the grid.

Islanded operation according to some inventive principles of this patent disclosure may be augmented with the use of power-line communications (PLC) and/or wireless communications among the power sources, as well as smart circuit breakers on the main feed lines or at the point of common connection (PCC).

Figure 1:
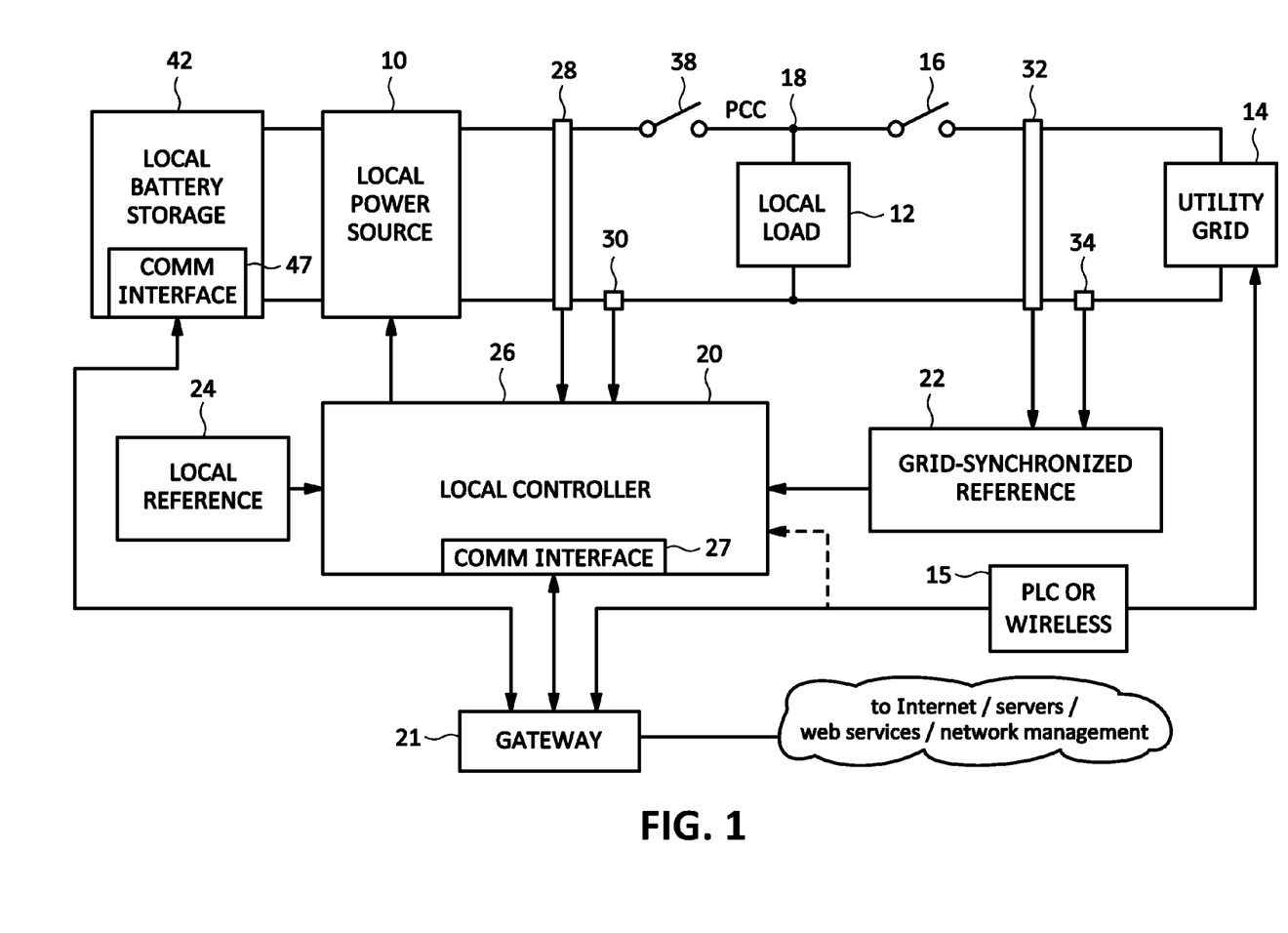
FIG. 1 illustrates an embodiment of a system capable of islanded operation according to some inventive principles of this patent disclosure.

FIG. 1 illustrates an embodiment of a system capable of islanded operation according to some inventive principles of this patent disclosure. The system of FIG. 1 includes a local power source 10 and a local load 12 connected to a grid 14 through a disconnect switch 16 at a point of common connection 18. A local controller 20 can control the local power source in response to either a grid-synchronized reference 22 when the grid is available or a local reference 24 when the grid is down. A first set of voltage and current sensors 28 and 30 provide feedback on the local load to the local controller. A second set of voltage and current sensors 32 and 34 provide feedback on the grid to the grid-synchronized reference. A communication interface 27 enables the local controller to be controlled remotely and to report operating conditions to remote control centers. An additional manual or automatic switch 38 may be included to isolate the load from the local power source. The disconnect switch 16 may be operated automatically or manually.

A gateway 21 may be included to concentrate data and/or interface the system components to other network functionality such as Internet access, data-servers, remote network management, etc. For example, the gateway may enable the implementation of a system-wide control algorithm as described below with respect to FIG. 6. The gateway is connected to the communication interfaces 27 and 47 on the local controller 20 and local battery storage device 42, respectively. The gateway is shown connected to the utility grid 14 through a power line communication (PLC) or wireless interface 15. Alternatively, interface 15 may be connected to the local controller 20 as shown with the dashed line so the gateway receives grid information indirectly through the local controller 20.

The local power source 10 may include a PV panel or array of PV panels, and centralized or panel-attached or panel-integrated microinverters. The PV array in its entirety, or in parts, can operate in an islanded environment. The inventive principles may also be applied to other types of power sources including wind turbines, geothermal sources, fuel cells, battery arrays, etc.

Figure 2:
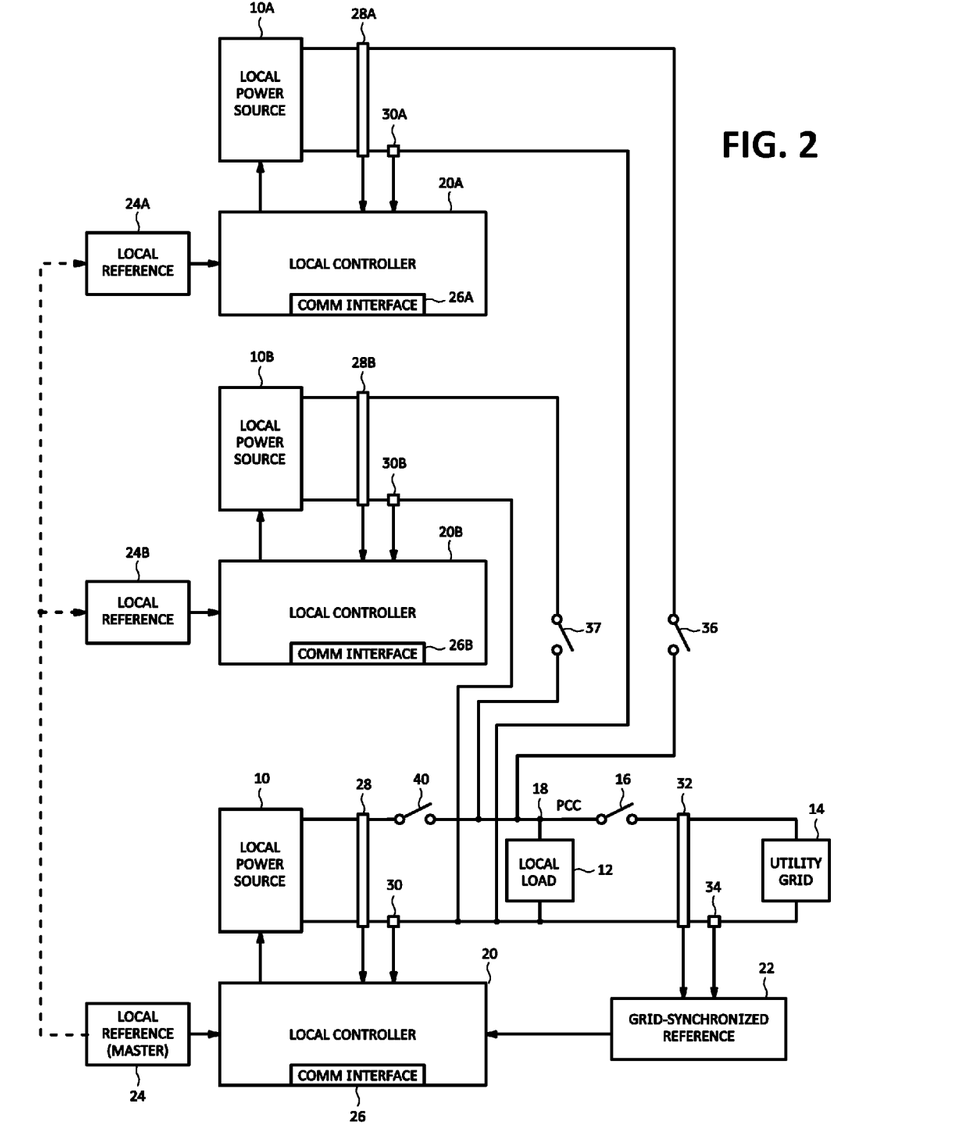
FIG. 2 illustrates another embodiment of a system capable of islanded operation according to some inventive principles of this patent disclosure.

FIG. 2 illustrates another embodiment of a system capable of islanded operation according to some inventive principles of this patent disclosure. The system of FIG. 2 includes a second local power source 10A, a second local controller 20A, and a second local reference 24A. It also includes a third local power source 10B, a third local controller 20B, and a third local reference 24B. In this embodiment, the local reference 24 for the first local power source 10 operates as a master reference that controls the second local reference 24A and the third local reference 24B. The first, second and third local power sources may be disconnected from the local load 12 by disconnect switches 40, 36 and 37, respectively. The switches are preferably automated and may be triggered by control signals from the gateway or any of the local controllers. In some embodiments, some or all of the disconnect switches may be manually operated.

Figure 3:
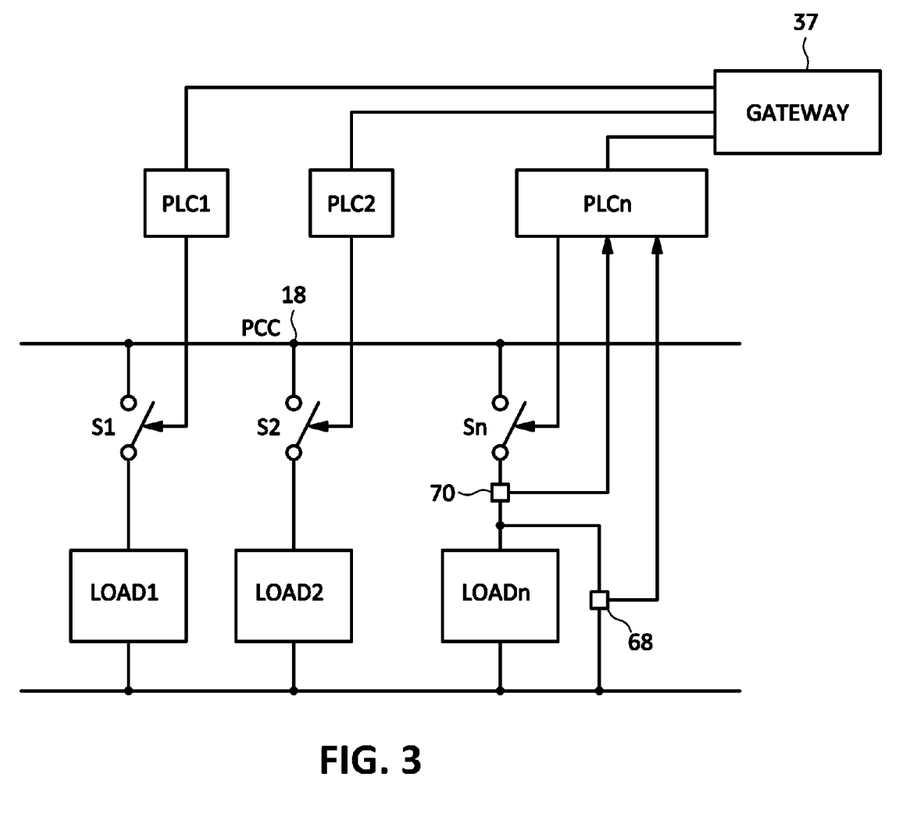
FIG. 3 illustrates an embodiment of a local load arrangement according to some inventive principles of this patent disclosure.

FIG. 3 illustrates an embodiment of a local load arrangement according to some inventive principles of this patent disclosure. The embodiment of FIG. 3, which may be used to implement local load 12 above, includes multiple loads LOAD 1, LOAD 2, . . . LOAD n, each of which may be connected to the point of common connection 18 by one of switches S1, S2, . . . Sn, respectively. Providing individual control of portions of the local load enables the implementation of additional features according to the inventive principles of this patent disclosure. For example, when the local load is connected to the local power source or the grid, the individual loads may be connected sequentially in stages, thereby reducing in-rush current. As another example, the use of individual switches enables the individual loads to be energized based on a system of priorities or other parameters in view of the limited amount of power that may be available from the local power source. Thus, in a highly automated factory, production equipment may be given priority over heating, air conditioning and/or lighting. In contrast, lighting or communication and display equipment may be given priority in areas with large amounts of pedestrian traffic, in retail spaces, etc.

In the embodiment of FIG. 3, switches S1, S2, . . . Sn are controlled by power-line communication (PLC) modules PLC1, PLC2, . . . PLCn, but other control technologies may be used. The PLC modules are connected to a smart communications gateway 37 which enables a controller to implement a control scheme based on priority and/or other parameters.

Various types of monitoring feedback apparatus may also be included. For example, the embodiment of FIG. 3 includes a voltage sensor 68 and a current sensor 70 to measure the load voltage and current of LOADn. The outputs from the sensors are transmitted to the gateway through the associated PLC module. Voltage, current and other types of sensors may be coupled to any of the other loads and interfaced to the gateway through the associated PLC modules.

In some embodiments, some or all of the local load or loads may be implemented with one or more power converters such as an AC-to-DC converter to charge batteries or other energy storage devices, such as device 42 illustrated in FIG. 1, either from the grid or one or more local power sources. The power from the energy storage devices may then be used as a local power source during islanded operation. The converters used for charging may be implemented as reversible power trains to enable the same converters to be used for both charging and discharging the batteries. Alternatively, separate power converters may be used to transfer power from the batteries or other energy storage devices during islanded operation.

Additionally, a local power source 10 as shown in FIG. 1 may be implemented with a reversible power converter for a local battery storage array. Thus, like the reversible loads described above, a local power source may store energy while the system is connected to the grid, then reverse its operation to supply power during an islanding operation.

In some embodiments, a smart communication interface may be included in some or all of the components to enable the implementation of various centralized and/or distributed control schemes according to some inventive principles of this patent disclosure. For example, in the embodiment of FIG. 1, a centralized controller may monitor the condition of the local load(s) and/or local power source(s) through the gateway 21 prior to a grid disconnection event. Based on the prior load conditions, the local load may be connected to a local power source in a transparent hand-off, e.g., if the local load has enough power sourcing capacity and/or if the load does not draw a large amount of in-rush current. Alternatively, an augmented hand-off may be implemented in which only certain loads are energized if the local power source capacity is less than the total demand by the local loads, or to implement a current in-rush limiting feature.

Figure 4:
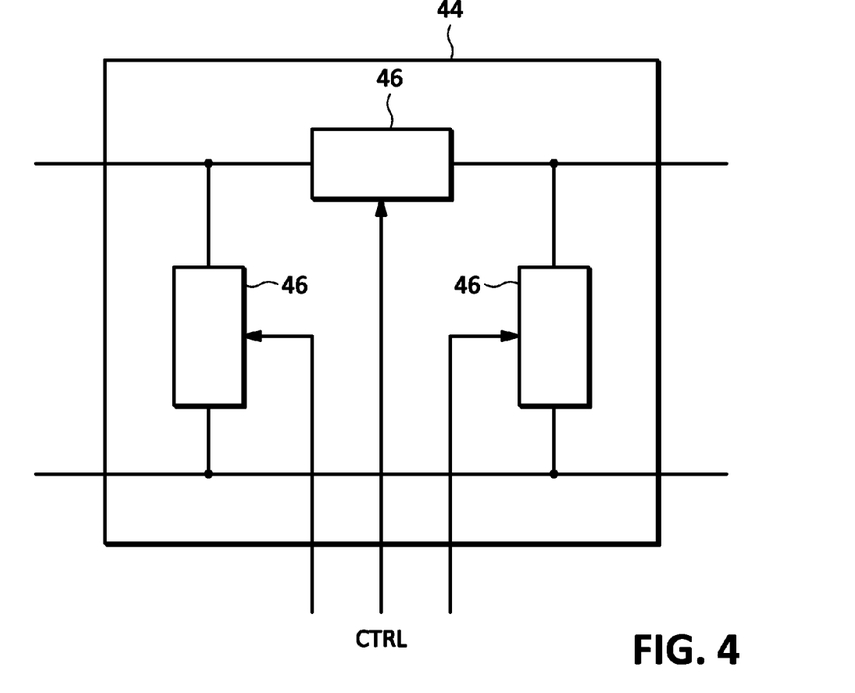
FIG. 4 illustrates an embodiment of current in-rush limiting functionality according to some inventive principles of this patent disclosure.

FIG. 4 illustrates some additional current in-rush limiting functionality according to some inventive principles of this patent disclosure. In-rush protection circuit 44 may include one or more controllable current limiting elements 46 which may be controlled by one or more control signals CTRL. The control signals may be generated by one of the local controllers, or by a centralized controller through a communication interface. The embodiment of FIG. 4 includes three current limiting elements 46 arranged in a π-network, but the elements may be arranged in a T-network or any other suitable arrangement, and any number of elements may be used.

An in-rush limiting circuit such as the one illustrated in FIG. 4 may be inserted at any suitable point in the system. For example, an in-rush limiting circuit may be inserted between the local load 12 and the local power source 10 in FIG. 1, or it may be inserted in series with any of the local power sources 10, 10A or 10B in FIG. 2.

Figure 5:
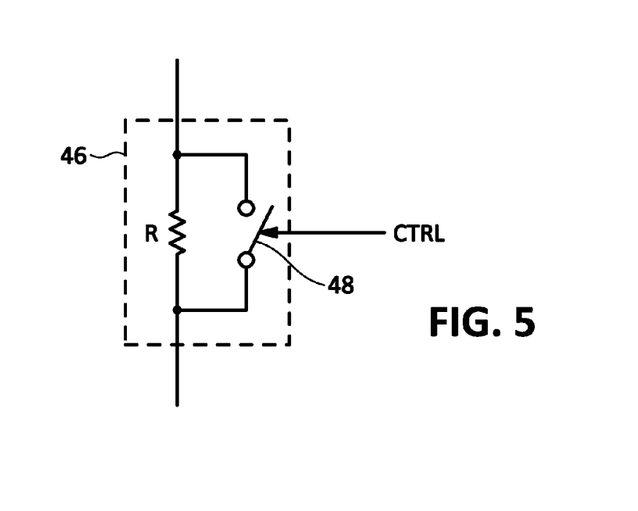
FIG. 5 illustrates an example embodiment of a controllable current limiting element according to some inventive principles of this patent disclosure.

FIG. 5 illustrates an example embodiment of one of the controllable current limiting elements 46. A switch 48 is initially open so that a resistor R limits the amount of in-rush current flowing through the element. For example, if the local load includes an input capacitance, or an induction motor that draws a large amount of start-up current, the resistor limits the in-rush current through an RC or RL time constant. After the in-rush current subsides, the control signal CTRL closes the switch 48, thereby eliminating the series resistance R from the circuit.

Figure 6:
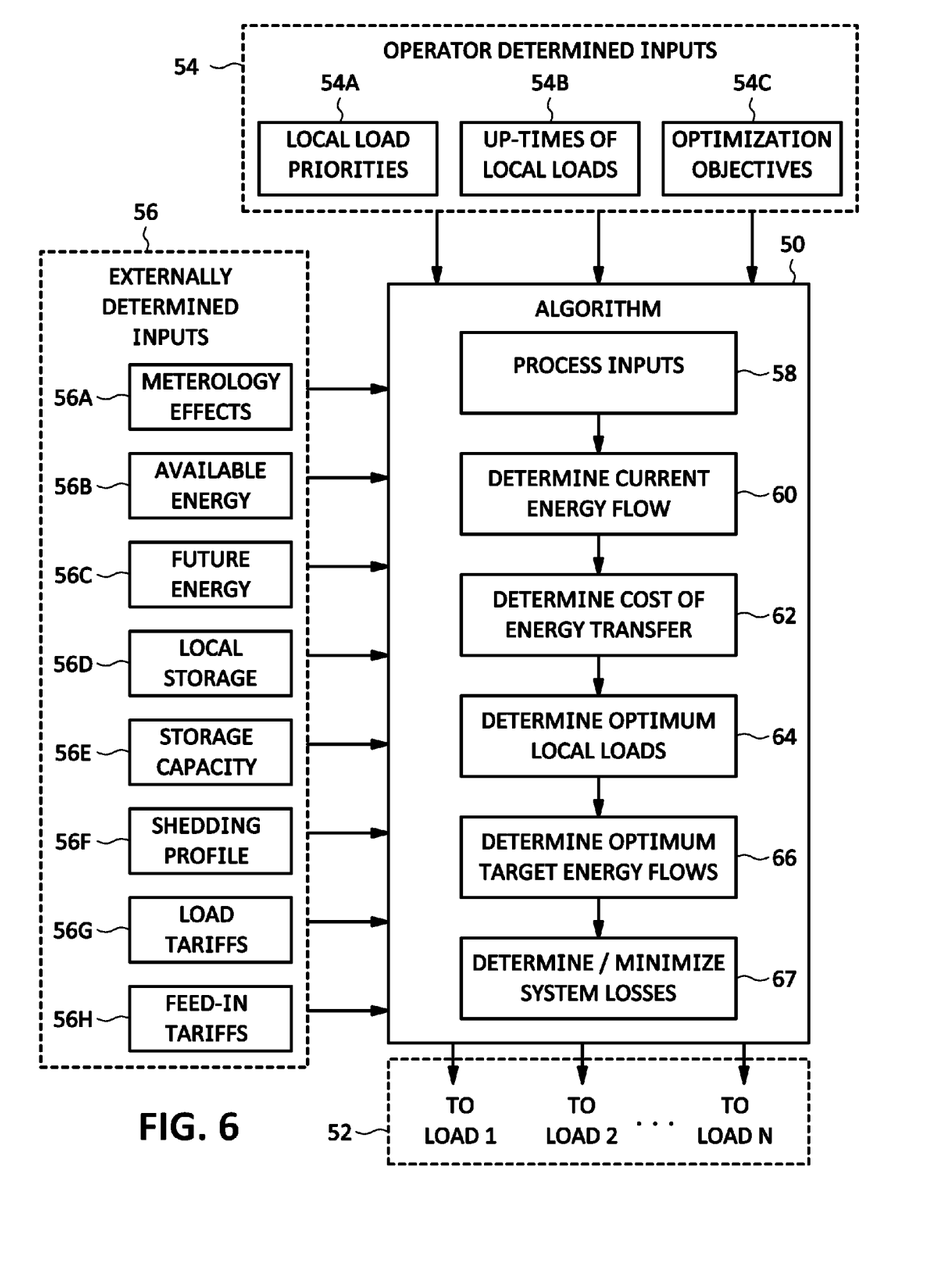
FIG. 6 illustrates an embodiment of a method for controlling a system having local loads and local power sources connected to a utility grid through a point of common connection according to some inventive principles of this patent disclosure

FIG. 6 illustrates an embodiment of a method for controlling a system having local loads and local power sources connected to a utility grid through a point of common connection according to some inventive principles of this patent disclosure. The local loads and local power sources may become islanded if the utility grid becomes disconnected at the point of common connection. The method involves evaluating the power available from the local power sources, and adaptively controlling the local loads according to an algorithm in response to the power available from the local power sources. The local loads and local power sources may be operated as an islanded system while the utility grid is disconnected from the point of common connection.

In the embodiment of FIG. 6, an algorithm 50 generates load control signals 52 in response to operator determined inputs 54 and externally determined inputs 56. Examples of operator determined inputs include local load priorities 54A, desired up-times of local loads 54B, and optimization objectives 54C. Examples of externally determined inputs include effects of meteorology on local loads 56A, energy currently available from local power sources 56B, predicted future energy available from local power sources 56C, energy available in local storage 56D, remaining local energy storage capacity 56E, load shedding profile from the utility grid 56F, load tariff rates 56G, and feed-in tariff rates 56H.

In general, there may be multiple complex objectives, which may optionally have priorities. For example, the algorithm may implement one or more of the following objectives simultaneously and/or individually under different operating conditions: (1) maximizing the local use of power from the local power sources; (2) minimizing the overall cost of energy; (3) maximizing the amount of locally stored energy; and (4) optimizing the use of locally stored energy to maximize the up-time of local loads when sufficient energy is not available from the utility grid and the local power sources, e.g., during an islanding event.

The algorithm 50 may operate as a software loop that begins by executing a process 58 for processing the various inputs. Examples of processing inputs include checking for updates to local load priorities, checking for updates to the desired up-time of various local loads, checking for updates to the optimization priorities, using meteorology data to update the effects of weather on current and predicted future local load levels and energy available from local power sources, determining the amount of energy currently available from local power sources, predicting the future energy available from local power sources for the longest possible duration into the future, determining the amount of energy currently available in local storage, determining the additional remaining local energy storage capacity, requesting the utility grid load shedding profile, requesting load tariff rates, and requesting feed-in tariff rates for the longest possible duration into the future.

After processing the inputs, algorithm executes a process 60 to determine the current energy flow between the various system elements. Examples include energy flow from the local power sources to the utility grid, from the local power sources to local storage, from the local power sources to local loads, from the utility grid to the local loads, from the utility grid to local storage, from local storage to the local loads, and from local storage to the utility grid.

Next, the algorithm executes a process 62 to determine the cost of energy transfer between the system elements. This may include the cost of the same examples of energy transfer described above with respect to process 60.

After determining the cost of energy transfer, the algorithm executes a process 64 to determine the optimum local load levels based on the local load priorities, desired up-times of various local loads, and/or the optimization objectives.

Next, the algorithm executes a process 66 to determine the optimum target energy flow between the system elements. This may include the same examples of energy transfer described above with respect to process 60.

After determining the optimum target energy flow, the algorithm executes a process 67 to determine and minimize system losses.

Finally, the algorithm generates the load control signals 52 to energize or de-energize specific local loads and prepare and set the new target energy flow between the system elements based on the determinations in the previous processes. The target local loads and target energy flows may optionally be achieved using optimum transient behavior characteristics.

The processes 58 through 66 may be repeated in a continuous loop running at any suitable repetition rate.

The inventive principles of this patent disclosure have been described above with reference to some specific example embodiments, but these embodiments can be modified in arrangement and detail without departing from the inventive concepts. Such changes and modifications are considered to fall within the scope of the claims following the Appendices.

The invention claimed is:

1. A method for controlling a system having local loads, different from a utility grid, and local power sources connected to the utility grid through a point of common connection, the method comprising:
    detecting an islanding condition wherein the local power sources are islanded from the utility grid;
    evaluating, responsive to detecting the islanding condition, a power available from each of the local power sources;
    adaptively controlling, while the islanding condition is occurring, a power supplied to each of the local loads based on the power available from the local power sources wherein adaptively controlling the power supplied comprises implementing an algorithm in response to operator determined inputs and externally determined inputs, wherein implementing the algorithm comprises:
        determining the current energy flow between the system elements;
        determining the cost of energy transfer between the system elements; and
        determining the optimum states of the local loads;
    and
    operating the local loads and one or more local power sources as an islanded system while the utility grid is disconnected from the point of common connection.

2. The method of claim 1 wherein one of the local power sources comprises a reversible power converter to enable the power source to operate as a local load.

3. The method of claim 2 wherein the reversible power converter is coupled to an energy storage device to store energy while the power converter is operating as a local load.

4. The method of claim 1 wherein the operator determined inputs comprise at least one of:
   local load priorities;
   desired up-times of the local loads; and
   optimization objectives.

5. The method of claim 4 wherein the optimization objectives comprise at least one of:
   maximizing local use of power from the local power sources;
   minimizing overall cost of energy;
   maximizing locally stored energy; and
   optimizing use of locally stored energy when sufficient energy is not available from the utility grid and the local power sources.

6. The method of claim 1 wherein the externally determined inputs comprise at least one of:
   effect of meteorology on local loads;
   energy currently available from local power sources;
   predicted future energy available from local power sources;
   energy available in local storage;
   remaining local energy storage capacity;
   load shedding profile from the utility grid;
   load tariff rates; and
   feed-in tariff rates.

7. The method of claim 1 further comprising energizing or de-energizing the local loads in response to the algorithm.

8. The method of claim 1 wherein the current energy flow between the system elements includes at least one of energy flow:
   from the local power sources to the utility grid;
   from the local power sources to local storage;
   from the local power sources to local loads;
   from the utility grid to the local loads;
   from the utility grid to local storage;
   from local storage to the local loads; and
   from local storage to the utility grid.

9. The method of claim 1 wherein the cost of energy transfer between the system elements includes at least one of energy flow:
   from the local power sources to the utility grid;
   from the local power sources to local storage;
   from the local power sources to local loads;
   from the utility grid to the local loads;
   from the utility grid to local storage;
   from local storage to the local loads; and
   from local storage to the utility grid.

10. The method of claim 1 wherein the optimum states of the local loads are determined based on at least one of the new target optimum energy flow:
    from the local power sources to the utility grid;
    from the local power sources to local storage;
    from the local power sources to local loads;
    from the utility grid to the local loads;
    from the utility grid to local storage;
    from local storage to the local loads; and
    from local storage to the utility grid.

11. A smart communications gateway for controlling a system having local loads different from a utility grid and local power sources connected to the utility grid through a point of common connection, wherein the smart communications gateway is configured to:
    detect an islanding condition wherein the local power sources are islanded from the utility grid;
    evaluate, responsive to detecting the islanding condition, a power available from each of the local power sources;
    adaptively control, while the islanding condition is occurring, a power supplied to each of the local loads based on the power available from the local power sources, wherein to adaptively control the power supplied comprises to implement an algorithm in response to operator determined inputs and externally determined inputs, wherein to implement the algorithm comprises to:
        determine the current energy flow between the system elements;
        determine the cost of energy transfer between the system elements; and
        determine the optimum states of the local loads;
    and
    operate the local loads and one or more local power sources as an islanded system while the utility grid is disconnected from the point of common connection.

12. The smart communications gateway of claim 11, wherein the operator determined inputs comprise at least one of:
    local load priorities;
    desired up-times of the local loads; and
    optimization objectives.

* * * * *